United States Patent
Meron et al.

(10) Patent No.: US 11,422,983 B2
(45) Date of Patent: Aug. 23, 2022

(54) MERGING DATA BASED ON PROXIMITY AND VALIDATION

(71) Applicant: PAYPAL, INC., San Jose, CA (US)

(72) Inventors: Avishay Meron, Gush-Dan (IL); Dudu Markovitz, Herzliya (IL)

(73) Assignee: PayPal, Inc., San Jose, CA (US)

( * ) Notice: Subject to any disclaimer, the term of this patent is extended or adjusted under 35 U.S.C. 154(b) by 134 days.

(21) Appl. No.: 15/841,189

(22) Filed: Dec. 13, 2017

(65) Prior Publication Data

US 2019/0179925 A1 Jun. 13, 2019

(51) Int. Cl.
*G06F 16/21* (2019.01)
*G06F 16/29* (2019.01)
*G06F 16/23* (2019.01)
*G06F 16/17* (2019.01)

(52) U.S. Cl.
CPC ........ *G06F 16/211* (2019.01); *G06F 16/1737* (2019.01); *G06F 16/2379* (2019.01); *G06F 16/29* (2019.01)

(58) Field of Classification Search
CPC ............... G06F 16/211; G06F 16/2379; G06F 16/1737; G06F 16/29
See application file for complete search history.

(56) References Cited

U.S. PATENT DOCUMENTS

| | | | |
|---|---|---|---|
| 6,374,241 B1 * | 4/2002 | Lamburt | G06F 16/954 |
| 6,865,567 B1 | 3/2005 | Oommen et al. | |
| 2005/0253075 A1 | 11/2005 | Jones et al. | |
| 2006/0064374 A1 * | 3/2006 | Helsper | G06Q 30/02 705/39 |
| 2008/0191007 A1 * | 8/2008 | Keay | G06Q 40/02 235/379 |
| 2012/0005209 A1 * | 1/2012 | Rinearson | G06F 16/80 707/737 |
| 2013/0166195 A1 * | 6/2013 | Bandyopadhyay | G01S 19/49 701/412 |
| 2013/0218909 A1 * | 8/2013 | Chu | G06Q 10/10 707/752 |

(Continued)

OTHER PUBLICATIONS

Patrick Wieschollek, et al., "Efficient Large-scale Approximate Nearest Neighbor Search on the GPU," 2016, IEEE Conference on Computer Vision and Pattern Recognition (CVPR) from https://arxiv.org/pdf/1702.05911.pdf.

(Continued)

*Primary Examiner* — Cam Y T Truong
(74) *Attorney, Agent, or Firm* — Haynes and Boone, LLP

(57) ABSTRACT

Various systems, mediums, and methods herein describe aspects of a proximity and validation based data merging system. The system may access a first data set and a plurality of second data sets that correspond to physical locations in a location space. The system my segment the location space into a plurality of location bins each having one or more nodes. The system may generate two or more maps based on two or more mapping rule and map the first data set and the plurality of second data sets into the nodes of the location bins. The system may determine one or more target nodes in the maps that include the first data set and at least one of the second data sets. The system may determine a minimum distance between the first data set and one of the second data sets in a target node.

20 Claims, 10 Drawing Sheets

(56) References Cited

U.S. PATENT DOCUMENTS

2014/0280356 A1   9/2014  Danilak et al.
2014/0358960 A1  12/2014  Levi
2014/0365707 A1* 12/2014  Talagala .............. G06F 12/0246
                                                      710/308

OTHER PUBLICATIONS

Kashmir Hill, "How an internet mapping glitch turned a random Kansas farm into a digital hell," Apr. 10, 2016, from https://splinternews.com/how-an-internet-mapping-glitch-turned-a-random-kansas-f-1793856052.

Herve Jegou, et al., "Product Quantization for Nearest Neighbor Search," 2011, IEEE Transactions on Pattern Analysis and Machine Intelligence, Institute of Electrical and Electronics Engineers, pp. 117-128. <10.1109/TPAMI.2010.57>. <inria-00514462v2>.

Yannis Kalantidis, et al., "Locally Optimized Product Quantization for Approximate Nearest Neighbor Search," from image.ntua.gr/iva/files/lopq.pdf.

Stavros Papadopoulos, et al., "Nearest Neighbor Search with Strong Location Privacy," The 36th International Conference on Very Large Data Bases, Sep. 13-17, 2010, Singapore, Proceedings of the VLDB Endowment, vol. 3, No. 1.

Herve Jegou, et al., "Product quantization for nearest neighbor search.".

International Appl. No. PCT/US2018/065289, International Search Report and Written Opinion dated Mar. 25, 2019, 10 pages.

* cited by examiner

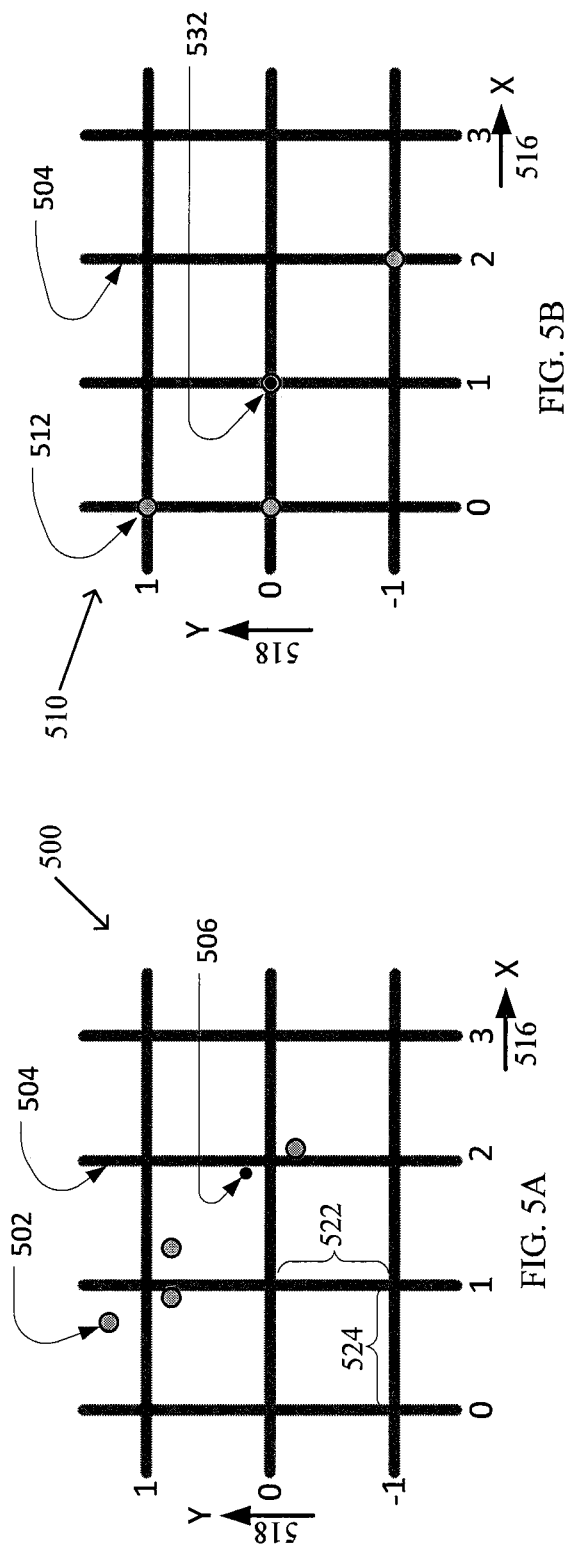
FIG. 5A
FIG. 5B
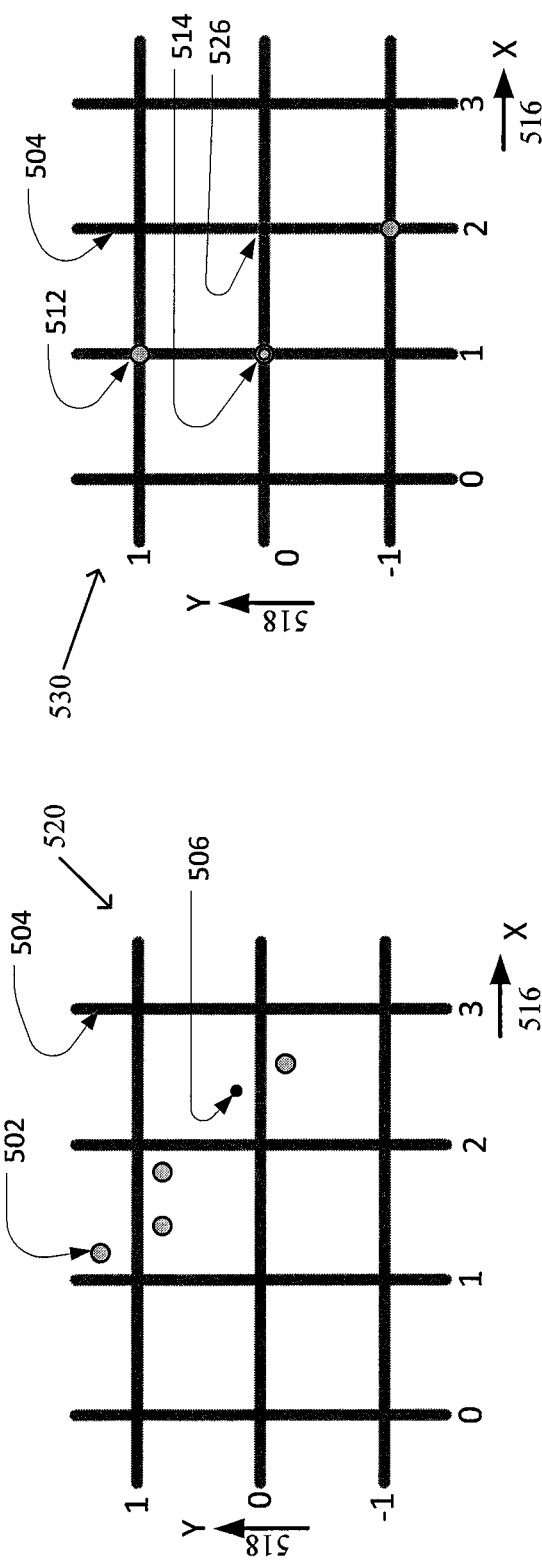
FIG. 5C
FIG. 5D

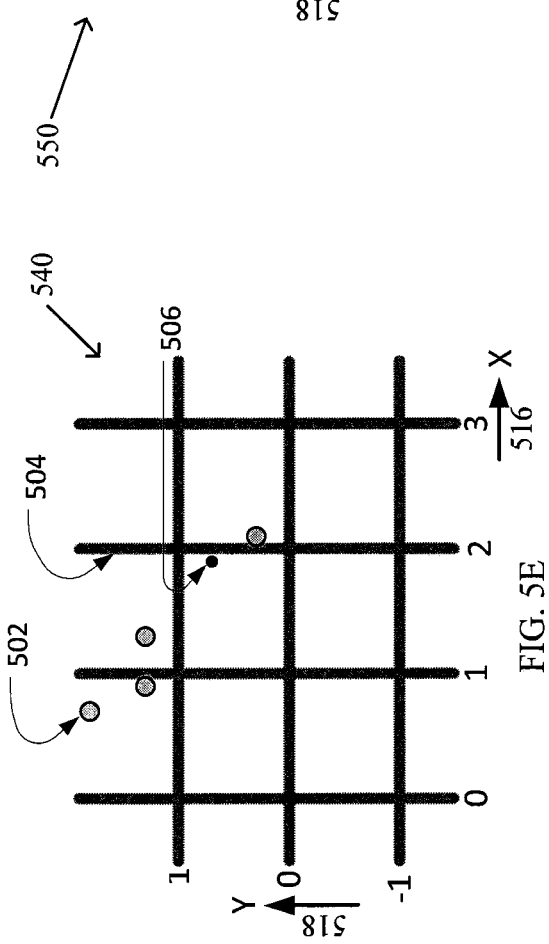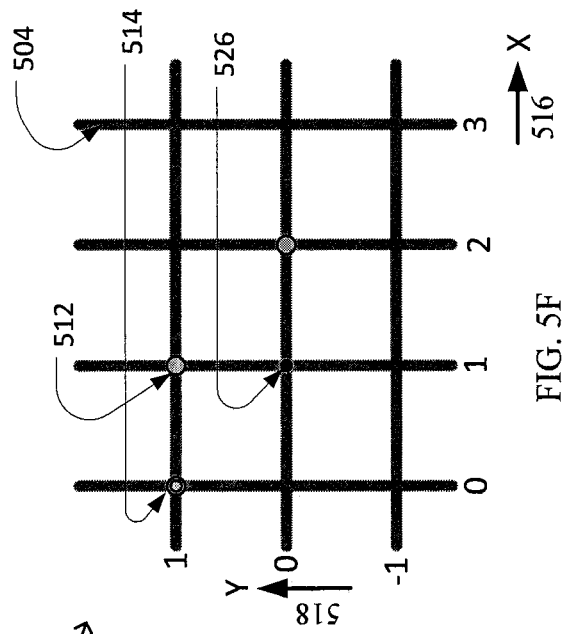
FIG. 5E
FIG. 5F
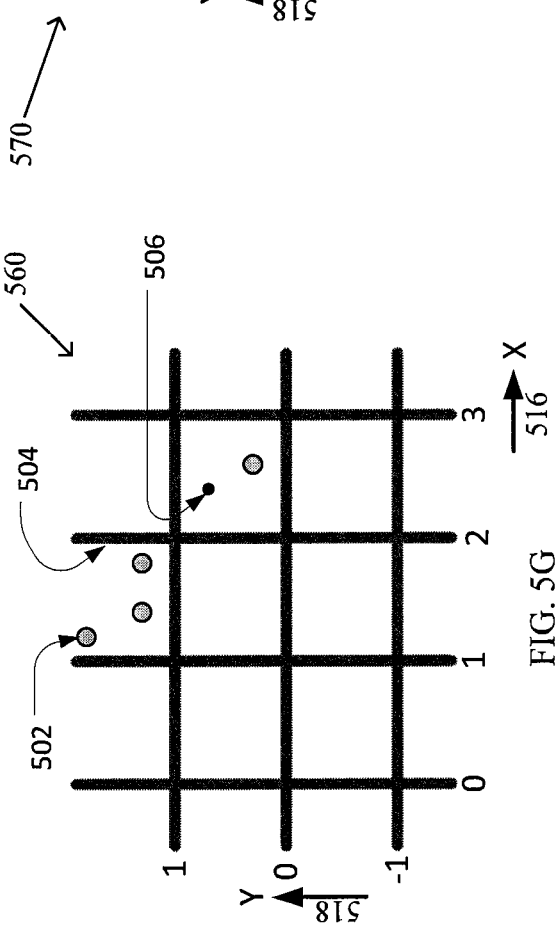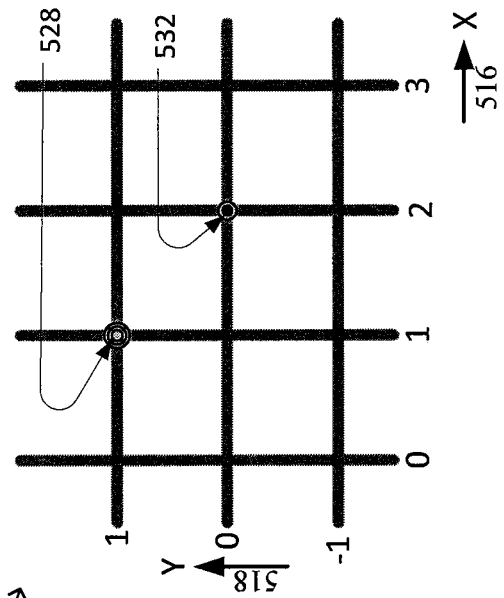
FIG. 5G
FIG. 5H

MERGING DATA BASED ON PROXIMITY AND VALIDATION

TECHNICAL FIELD

Embodiments disclosed herein are generally related to distributed computer processing and more particularly to merging two data sets into a data set to reduce computation time.

BACKGROUND

Distance calculations may involve comparing a point with one or more other points to determine which of the other points are nearest to the original point. This problem may arise in a variety of settings. When dealing with large data sets, however, it can be computationally expensive to execute comparisons of each point to a large number of other points, however (e.g. between a first data set and a second data set).

There is therefore a need for technological advancements for a faster determination of the distance between a first data set and a plurality of second data sets having large numbers of elements.

BRIEF DESCRIPTION OF THE DRAWINGS

FIGS. 5A-5H are exemplary data sets mapped to location bins, according to an embodiment;

Figure 1A:
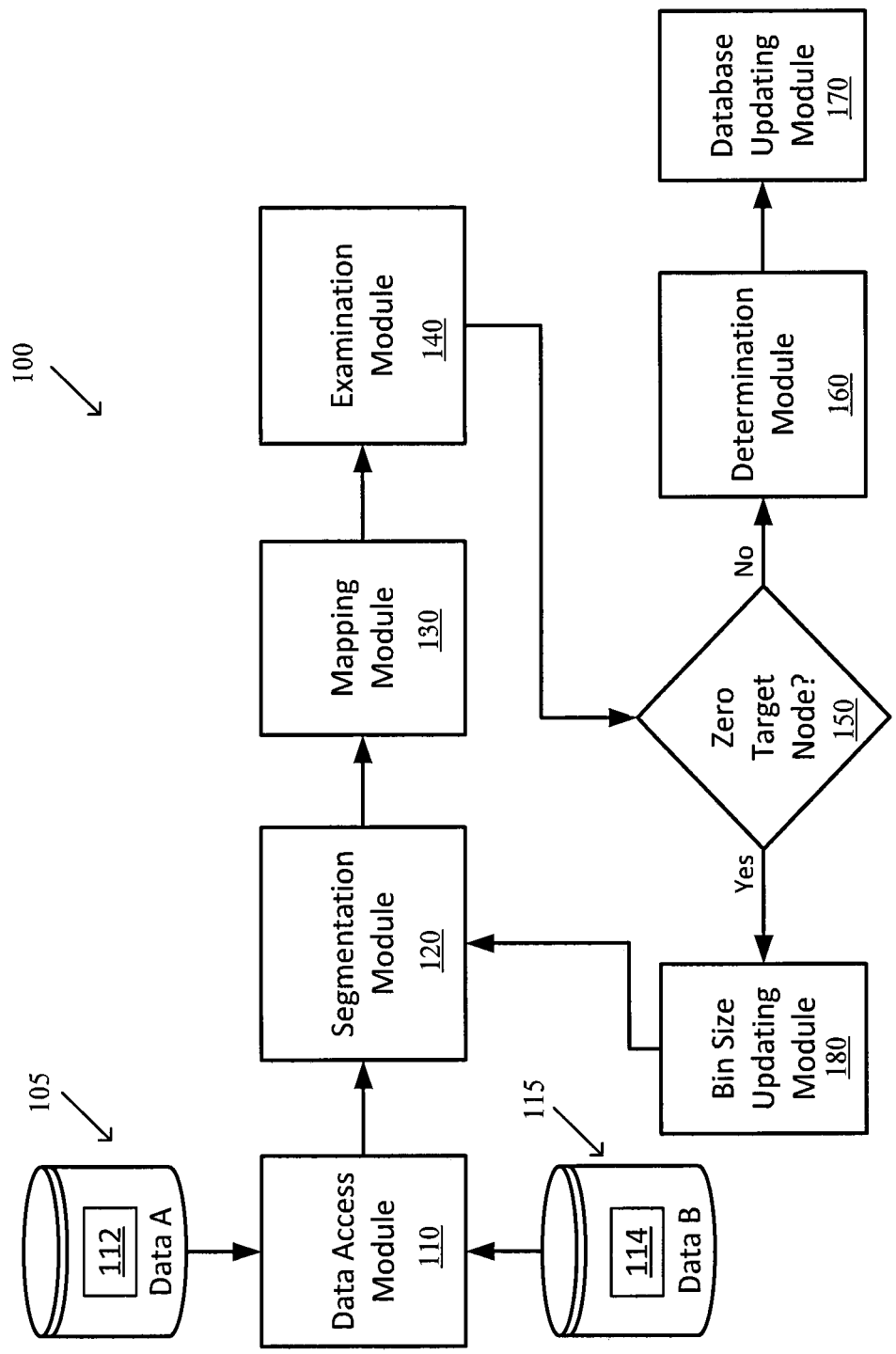
FIG. 1A is a block diagram of an exemplary proximity and validation determination system, according to an embodiment.

Embodiments of the present disclosure and their advantages may be understood by referring to the detailed description provided herein. It should be appreciated that reference numerals may be used to illustrate various elements and/or features provided in the figures. Further, the figures may illustrate various examples for purposes of illustration and explanation related to the embodiments of the present disclosure and not for purposes of any limitation.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

In some embodiments, one or more hardware processors of a system may execute a data access module, a segmentation module, a mapping module, an examination module, a determination module, a bin size updating module, and a database updating module. The data access module obtains a first data set from a first database and also obtains a plurality of second data sets from a second database. Both the first data set and the plurality of second data sets include location information that corresponds to physical locations in a location space. The segmentation module divides the location space into a plurality of location bins based on a location bin size. Each location bin includes at least two nodes that may connect to the adjacent bins and the nodes are shared between the adjacent bins. The mapping module maps the first data set of the first database and the plurality of the second data sets of the second database to the nodes of the plurality of the location bins of the location space. The mapping module uses two or more mapping rules for mapping the first data set and the plurality of the second data sets into the nodes of the plurality of location bins and creates two or maps. The mappings to the nodes of the plurality of the location bins of the location space are based on the location information of the first data set and on the location information of the plurality of the second data sets. The examination module searches the nodes of the plurality of location bins in each of the two or more maps to find target nodes that include the mapped first data set and at least one mapped second data set. If any such target node is found in at least one of the maps, then the determination module determines the physical distance between the first data set and each of the second data sets in the target node of each map. The determination module determines the least physical distance between the first data set and the plurality of the second data sets by determining the least physical distance between the first data set and the second data sets in each target node. The determination module further determines the second data set having the least physical distance to the first data set as the target second data set. In some embodiments, the first data set includes first additional information and the second data set includes second addition information. The determination module further validates the first data set based on the first additional information of the first data set the second additional information of the target second data set. In some examples, the validation is performed based on a first Internet Protocol (IP) address included in the first additional information of the first data set and a second IP address included in the second additional information of the target second data set. After validation, a database updating module updates the first database and the second database by merging the validated first data set into the second data sets of the second database and removing the first data set from the first database.

Distance calculations are usually invoked to determine proximity of a first data set to a plurality of second data sets. The first data set and the plurality of second data sets may be associated with physical locations in a two-dimensional space and the distance calculations may involve using the physical locations to determine physical distances between the first data set and the plurality of second data sets in a two-dimensional space, such as using $L^2$ norms, between the physical location of the first data set and physical locations of the elements of the plurality of second data sets. Note that any distance in any matrix space maybe determined (e.g., $L^1$, $L^2$, etc. norms and Geodesic distances, etc.). A minimum of the calculated distances is then determined as the least distance between the first data set and the plurality of second data sets. In some examples, the plurality of second data sets comprises a database with a large number of elements and calculating the distances between the first data set and the elements of the plurality of second data sets may be time consuming and require significant processing power. Additionally, it may be required to determine the distances between a number of first data sets with the plurality of second data sets having the large number of elements, which can become very time consuming.

In some embodiments, a method for addressing the above by merging data sets comprises accessing, by one or more hardware processors, a first data set comprising first location information corresponding to a first physical location in a location space; accessing, by the one or more hardware processors, a plurality of second data sets, wherein each one of the second data sets comprises second location information corresponding to a second physical location in the location space; segmenting the location space, by the one or more hardware processors, into a plurality of location bins based at least on a location bin size, wherein each one of the plurality of location bins comprises one or more nodes; determining, by the one or more hardware processors, two or more mapping rules, wherein each one of the mapping rules is configured to map the first data set based on the first location information and each one of the second data sets based on the second location information to a node of a location bin; generating, by the one or more hardware processors, two or more maps based on the two or more mapping rules; determining, by the one or more hardware processors in the two or more maps, one or more target nodes that comprise the first data set and at least one of the second data sets; determining, by the one or more hardware processors, one or more target distances in the one or more target nodes between the first data set and the at least one of the second data sets of a same target node based on the first location information and the second location information; determining, by the one or more hardware processors, a target second data set that corresponds to a minimum of the one or more target distances; and merging the first data set into the plurality of the second data sets after a validation of the first data set.

In various circumstances, the example embodiments described herein may resolve various challenges in determining the proximity of a first data set to very large second data sets and improving the processing delay and computational time/power in the determination.

FIG. 1A is a block diagram of an exemplary proximity and validation determination system 100, according to an embodiment. The system 100 may include a data access module 110 that accesses one or more databases 105 and/or 115 to obtain one or more data sets 112 from database 105 and a plurality of data sets 114 from the database 115. Each data set may include location information associated with a physical location corresponding to the data set. The system 100 may also include a segmentation module 120 that receives the data sets 112 and 114 from the data access module 110, determines a location space associated with the data sets 112 and 114, determines a location bin size, and divides the location space into a plurality of location bins based on the location bin size. In some examples, the location bin size is determined prior to the segmentation. The segmentation module 120 is described in more detail with respect to FIG. 1B, and the location space and the location bins are described in more detail with respect to FIG. 3.

The system 100 may include a mapping module 130 that receives the data sets 112 and 114, the plurality of location bins, and two or more mapping rules. The mapping module 130 may use the two or more mapping rules to map the data sets 112 and 114 into the nodes of the location bins and generate two or more maps. The mapping module 130 is described in more detail with respect to FIG. 1C and a map generation process is described in more detail with respect to FIGS. 5A, 5B, 5C, 5D, 5E, 5F, 5G, and 5H.

The system 100 may include an examination module 140 that receives the two or more maps and searches the two or maps to find and identify one or more target nodes in the two or more maps such that in each target node, the data set 112 and at least one data set 114 coincide in a same node. The examination module 140 is described in more detail with respect to FIGS. 5B, 5D, 5F, and 5H. The system 100 may include a zero target node module 150 that determines the number of target nodes that are received from the examination module.

The system 100 may include a determination module 160 that is executed when at least one target node is found by the zero target node module 150. The determination module 160 that is described in more detail with respect to FIG. 1D determines the target second data set having a least distance between the data set 112 and the plurality of the data sets 114 and further validates the data set 112. The system 100 may also include a database updating module 170 that based on the validation, updates the databases 105 and 115. In some embodiments, the modules 110, 120, 130, 140, 150, 160, 170, and 180 of FIG. 1A are hardware modules, software modules, or a combination thereof.

In some examples, the zero target node module 150 may not find any target nodes in the two or more maps such that the data set 112 and at least one data set 114 may not coincide in a same node. The system 100 may further include a bin size updating module 180. If no target node is found, the bin size updating module 180 may adjust, e.g., increase, the location bin size of the segmentation module 120 and the described steps may be repeated. In some examples, the bin size updating module 180 may iteratively increase the location bin size until at least one target node is found in the two or more maps. In some embodiments, the location bin size may grow linearly or exponentially with each iteration.

In some examples, the location information may correspond to a physical location, e.g., a physical location in a two-dimensional location space. The location information of data set may include a longitude and/or latitude of the physical location and the longitude may vary from −180 degrees to +180 degrees and the latitude may vary from −90 degrees to +90 degrees. In some examples, the location information may be normalized into a real number between zero and a number less than or equal to 100, e.g., normalized between zero and 1.

In some examples, each one of the first data set or the second data set may also include additional information that can be used to determine other attributes of the data set. The additional information and/or the location information also includes one or more of a media access control address, a country name, a name of a state, a city name, a zip code, or a street address. In some examples, the system 100 may perform operations of a service provider, such as PayPal, Inc. of San Jose, Calif., USA.

In some embodiments, the bin size updating module 180 adjusts the location bin size based on attributes of the physical location and increases the location bin size in rural zones and decreases the location bin size in densely populated zones. In some examples, the location space may include both rural and densely populated zones and thus the bin size updating module 180 adjusts the location bin size differently in different zones of the location space. Note that operations performed by the modules as described herein may be combined into other modules or performed by one or more hardware processors.

Figure 1B:
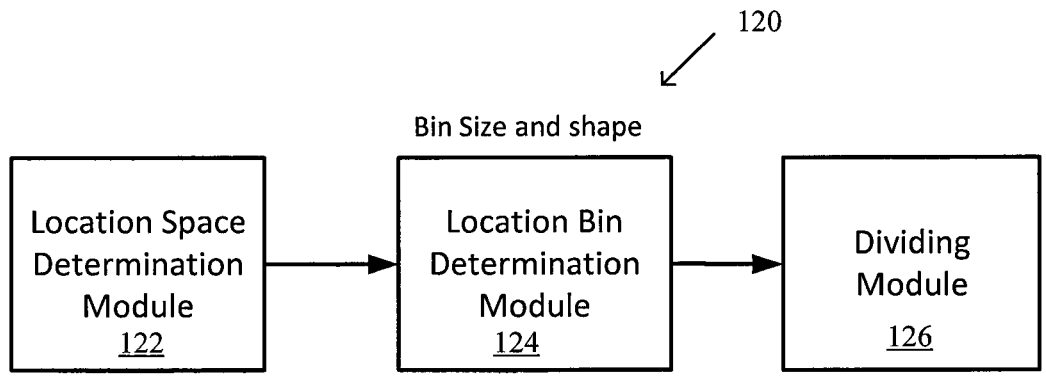
FIG. 1B is a block diagram of a segmentation module of the proximity and validation determination system, according to an embodiment.

FIG. 1B is a block diagram of a segmentation module 120 of the proximity determination system 100 according to an embodiment. The segmentation module 120 may include a location space determination module 122 that receives the data sets 112 and 114 from the data access module 110. As described each of the data set 112 and 114 may include location information corresponding to a physical location of the data set. The location space determination module 122 may extract the location information of the data sets 112 and 114 and may determine a location space that includes the physical locations corresponding to the data sets 112 and 114.

The segmentation module 120 may also include a location bin determination module 124 that receives the location space and the location information of the data sets 112 and 114 from the location space determination module 122 and determines a location bin size. In some examples, the location bin determination module 124 may use the location information of the plurality of data sets 114 to determine the location bin size such that in each one of the plurality of location bins, at least one data set 114 exists. The segmentation module 120 may also include a dividing module 126 that, based on the location bin size, divides the location space into the plurality of location bins. The location space and the location bins are described in more detail with respect to FIG. 3.

Figure 1C:
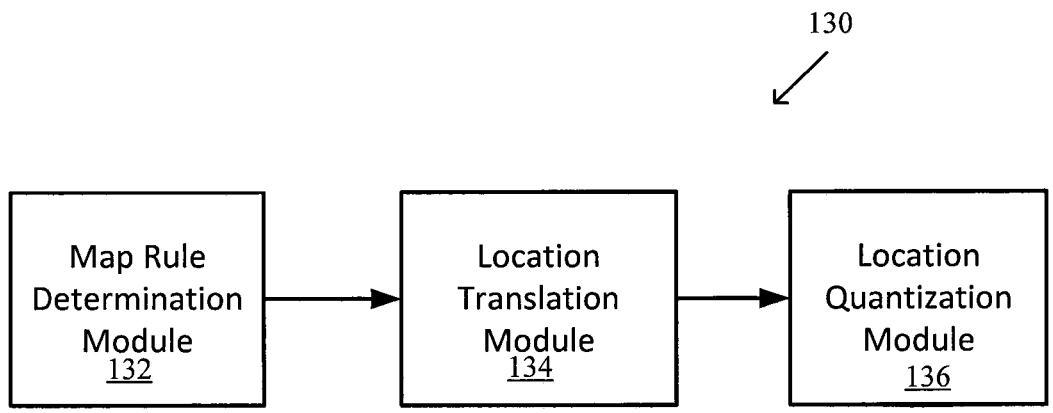
FIG. 1C is a block diagram of a mapping module of the proximity and validation determination system, according to an embodiment.

FIG. 1C is a block diagram of a mapping module 130 of the proximity and validation determination system 100 according to an embodiment. The mapping module 130 may include a map rule determination module 132 that receives the data sets 112 and 114, the location space, and the plurality of location bins, and determines, e.g., selects, two or more mapping rules. In some examples, the mapping rules are selected by the map rule determination module 132 based at least on the data sets 112 and 114, the location space, and/or the plurality of location bins. In some examples the number of mapping rules that perform different translations of location information is two to the power of the number of dimensions of the location space. In some examples, four mapping rules may be used in a two-dimensional location space of longitude and latitude.

The mapping module 130 may include a location translation module 134 that receives the data sets 112 and 114, the location space, the plurality of location bins, and the mapping rules. The location translation module 134 may further modify, based on a mapping rule, the location information of the data sets 112 and 114 for each mapping rule. In some examples, modifying the location information of the data sets 112 and 114 results in translating the data sets 112 and 114 in the location space and may move the data sets 112 and 114 from one location bin to another location bin. In some examples, each map rule incorporates a different modification to the location information of the data sets 112 and 114 and may translate the data sets 112 and 114 differently in the location space. In some examples, at least one mapping rule may not modify the location information of the data sets 112 and 114.

The mapping module 130 may include a location quantization module 136 that receives the translated data sets 112 and 114, the location space, the plurality of location bins, and the mapping rules, and quantizes the location information of the data sets 112 and 114. In some examples, as noted above, the plurality of location bins include one or more nodes, and the quantization of the location information of the data sets 112 and 114 transfers the data sets 112 and 114 to the nodes of the plurality of location bins such that after the quantization the data sets 112 and 114 are mapped to the nodes of the plurality of location bins.

In some embodiments, generating the maps includes translating the first location information of the first data set in a predetermined direction by a predetermined amount prior to the quantizing and translating the second location information of the plurality of second data sets in the predetermined direction by the predetermined amount prior to the quantizing.

In some embodiments quantizing transfers a data point in a location bin to a node of the same location bin. In some examples, the quantization operators include one or more of a floor, a ceiling, or rounding.

Figure 1D:
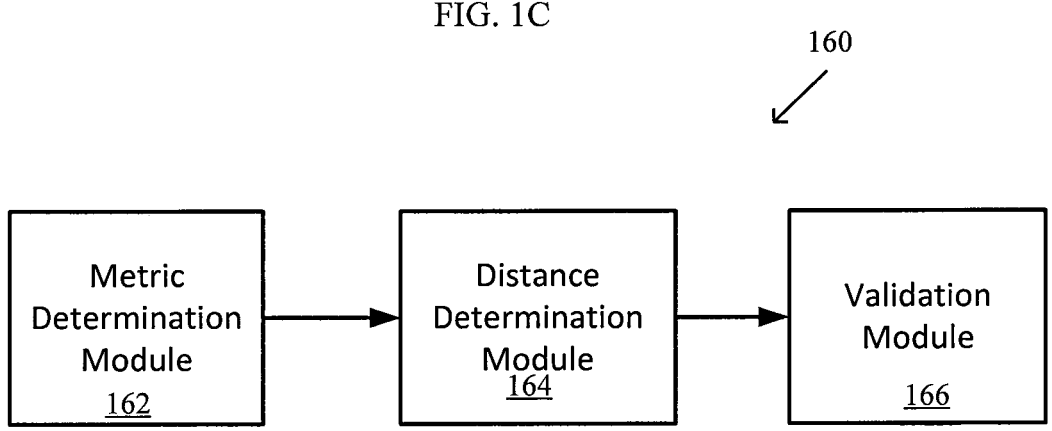
FIG. 1D is a block diagram of a determination module of the proximity and validation determination system, according to an embodiment.

FIG. 1D is a block diagram of a determination module 160 of the proximity and validation determination system 100 according to an embodiment. As described, the examination module 140 may generate one or more target nodes. The determination module 160 may include a metric determination module 162 that receives the one or more target nodes in the two or more maps that is generated by the examination module 140. As noted above, the data set 112 and the data set 114 may be mapped by the location translation module 134 and the location quantization module 136 to a same or target node. Because the coincidence of the data set 112 and at least one data set 114 in a single target node is due to quantization of the location information of the data sets, the physical location of data set 112 and the data set 114 may not coincide. Thus, the metric determination module 162 may determine, e.g., select, a metric for determining the physical distance between data set 112 and the data set 114. In some examples, an $L^n$ norm, e.g., an $L^2$ norm, may be selected as the metric for determining the distance between data set 112 and the data sets 114.

The determination module 160 may include distance determination module 164 that receives the location information of the data sets 112 and 114 in the target nodes and determines one or more target distances between data set 112 and each data set 114 in the target nodes based on the selected metric and using the location information, e.g., using the translated location information, of data sets 112 and 114. The distance determination module 164 then determines a minimum of the one or more target distances as the least distance between the first data set 112 and the plurality of second data sets 114. In some examples, the second data set 114 corresponding to minimum target distance is a target second data set.

In some examples, there is a tradeoff between increasing the bin size and the processing power used by the distance determination module 164. For example, although there may be a single first data set 112 in each target node, if the bin size is large there may be a plurality of the second data set 114 in each target node and thus increasing the processing power used by the distance determination module 164 to determine the target distances. The determination module 160 may include a validation module 166 that receives the target second data set as the closest point to the first data set and validates the first data set based on the additional information of the first data set and the additional information of the target second data set. In some examples, the first data set is a fraudulent data set and thus may not be validated. In some examples, the additional information of the first data set and the target second data set are Internet Protocol (IP) addresses. By examining the IP addresses, the validation module 166 may determine that the first data set is fraudulent. For example, a data set A may contain IP addresses and their geo coordinates (e.g., latitude and longitude) and a data set B may contain city-centers, in the format: state, country, city, region and geo-coordinates. A city center may be assigned for each IP address by finding the nearest neighbor over latitude and longitude.

Figure 2:
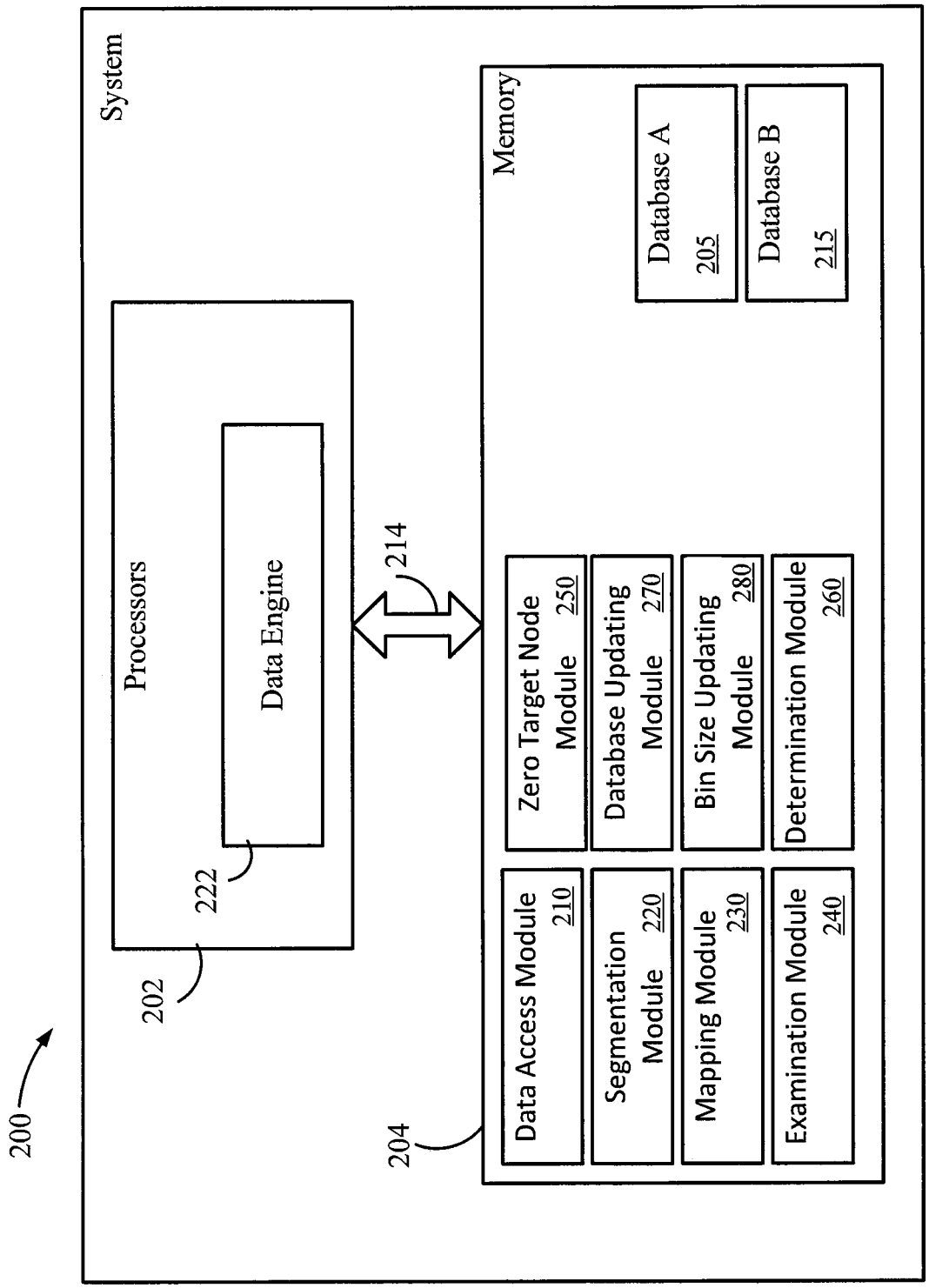
FIG. 2 is a block diagram of an exemplary proximity and validation determination system, according to an embodiment.

FIG. 2 is a block diagram of an exemplary proximity and validation determination system 200 according to an embodiment. As shown, the system 200 includes one or more processors 202 and a memory 204, such as a non-transitory memory. The memory 204 includes at least two databases, a first database 205 and a second database 215, which are consistent with the databases 105 and 115 of FIG. 1. The one or more processors 202 are coupled to memory 204 through a connection, e.g., bus 214, and may access the memory 204. In some examples, the one or more processors 202 may execute a data engine 222. The data engine 222 may be retrieved from the memory 204 and may include instructions that cause the system 200 to perform the operations described herein. In some other examples, the data engine 222 is included in the instructions, e.g., as part of the instructions that are stored in the memory 204. In some examples, the system 200 includes two or more memories including two or more non-transitory memories such that the instructions and the databases are stored in separate memories.

In some embodiments, as shown in system 200, one or more software modules that include a data access module 210, a segmentation module 220, a mapping module 230, an examination module 240, a zero target node module 250, a determination module 260, a database updating module 270, and a bin size updating module 280 that are consistent with the respective modules 110, 120, 130, 140, 150, 160, 170, and 180 of FIG. 1A may be stored in memory 204. In some examples, the data engine 222 executing on the one or more processors 202 may retrieve, via bus 214, one or more of the software modules from the memory 204 and may execute the retrieved software module(s).

In some examples, the data engine 222 may be implemented using hardware components, such as a processor, an application specific integrated circuit (ASIC), a programmable system-on-chip (SOC), a field-programmable gate array (FPGA), and/or programmable logic devices (PLDs), among other possibilities.

Figure 3:
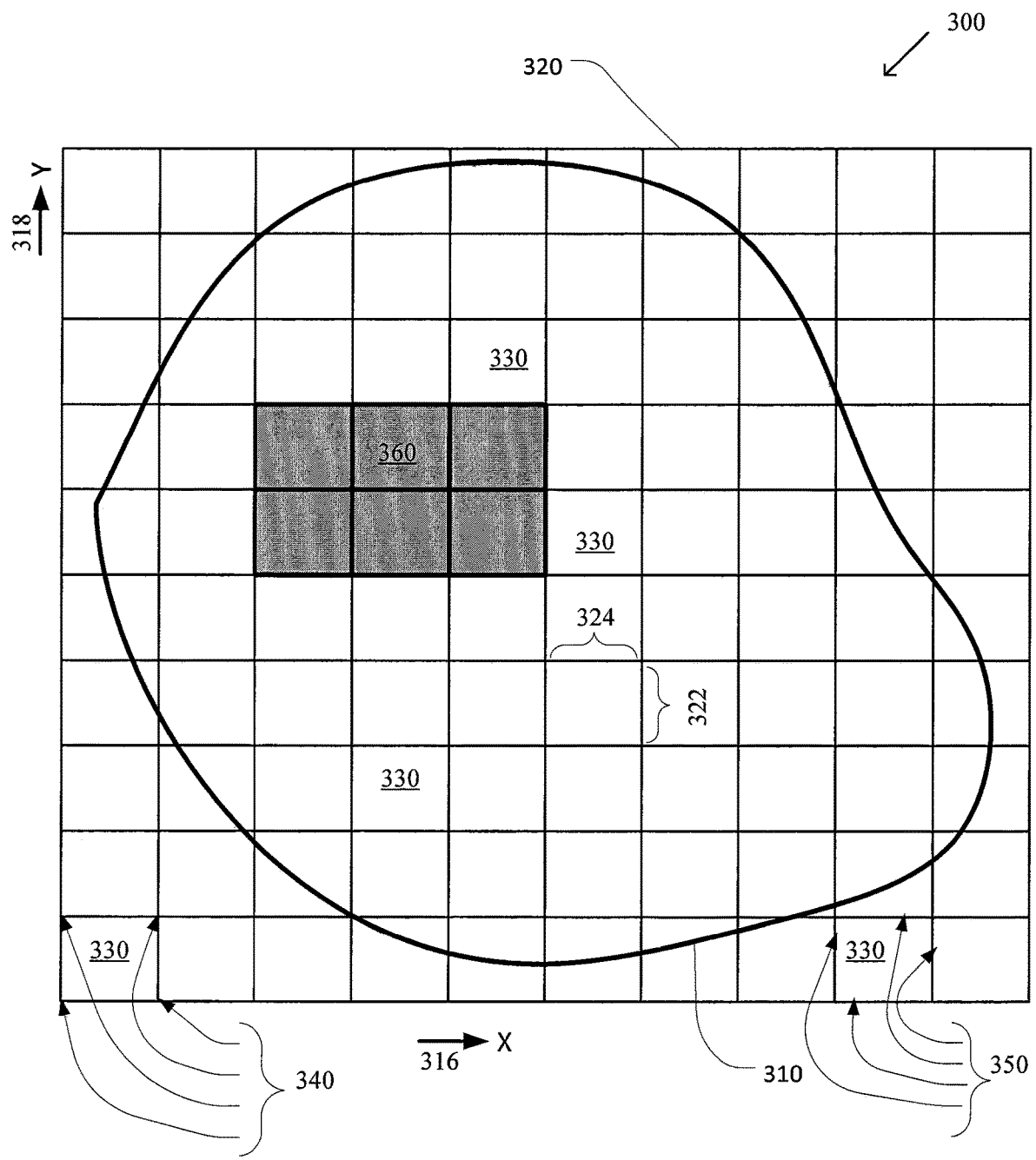
FIG. 3 is a diagram of exemplary plurality of location bins segmenting a location space, according to an embodiment.

FIG. 3 is a diagram 300 of exemplary plurality of location bins segmenting a location space according to an embodiment. As shown, a mesh 320 segments, e.g., divides, the location space 310 into a plurality of location bins 330. In some embodiments, the location space 310 is a two-dimensional space defined by an x-direction 316 and a y-direction 318, and the location bins 330 have a same first size 324 in x-direction 316 and a same second size 322 in y-direction 318. In some examples, the first size 324 and the second size 322 are the same. As shown in diagram 300, each location bin 330 includes one or more nodes 340 that may connect the adjacent bins and may be shared between the adjacent bins. In some examples, each location bin 330 includes one or more sides 350. In some embodiments, the plurality of location bins 330 may cover the location space 310. In some examples, the location space is one of a district in a city, one or more cities, one or more states in a country, one or more countries, one or more continents, or an entire globe.

In some examples, each one of the plurality of location bins 330 may include two or more nodes 340, and each two adjacent location bins from the plurality of location bins may connect and share one or more nodes from the two or more nodes.

As described, in some embodiments, the first data set and the plurality of second data sets include location information such that the location information may correspond to physical locations in a two-dimensional location space. In some examples, the physical locations that correspond to the first data set and the plurality of second data sets are included in the location space 310 of diagram 300 and the mesh 320 segments the location space 310 into a plurality of location bins 330 such that, based on their corresponding physical locations, the first data set the plurality of second data sets are distributed, e.g., mapped, into the location bins 330 of the location space 310. In some examples, the location bins may not be uniformly distributed in the location space 310. In some examples, in a first zone of the location space, the location bins are smaller than a second zone of the location space. In some examples, the location bins may have different shapes with different number of sides and nodes in different zones.

In some examples, x-direction 316 is a longitudinal direction and y-direction 318 is a latitude direction, the mesh is an arc mesh, and the first size 324 in x-direction 316 and the second size 322 in y-direction 318 are represented as angles. In some examples, the first size 324 and the second size 322 are represented as distances. The two by three bin section 360 of FIG. 3 is described in more detail with respect FIGS. 5A-5H.

Figure 4A:
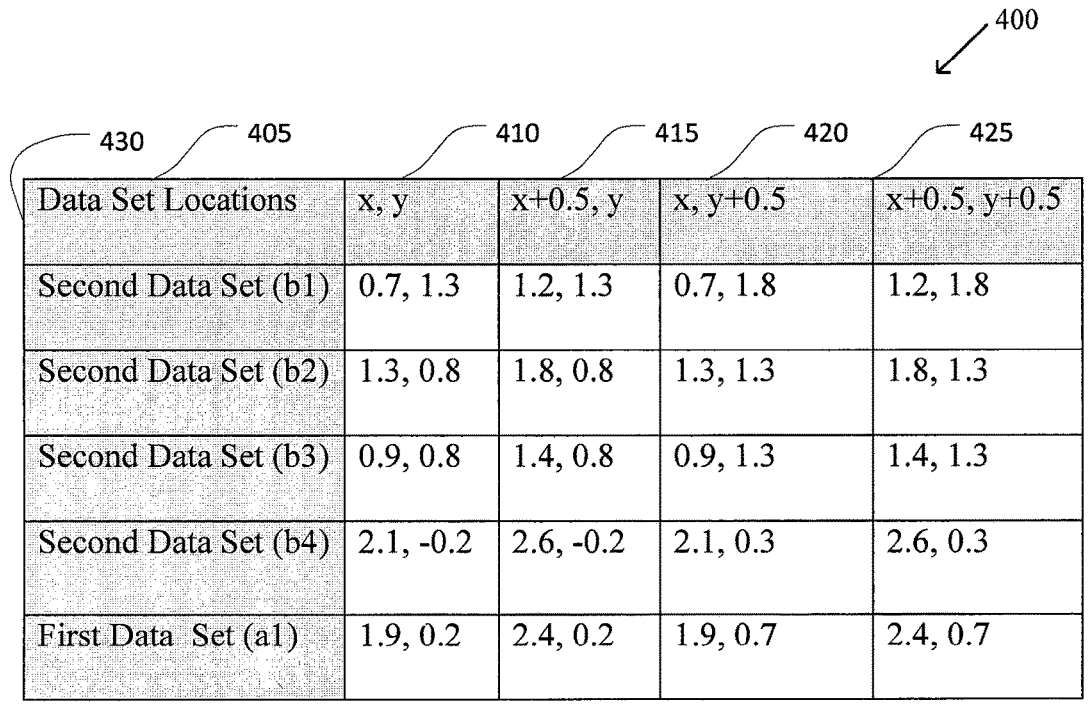
FIG. 4A is an exemplary table of data sets, according to an embodiment.

FIG. 4A is an exemplary table 400 of data sets according to an embodiment. Table 400 includes a column 405 that describes the row contents in table 400 that includes the physical locations corresponding to the second data sets b1, b2, b3, and b4, as well as the physical location corresponding to the first data sets a1. As described above, location translation module 134 of mapping module 130, depending on the mapping rule, translates the location information of the data sets in the location space. Table 400 includes four columns 410, 415, 420, and 425 such that each one of the columns corresponds to a different mapping rule and each one of the columns represents the translation direction and amount of the corresponding mapping rule. Column 410 corresponds to a first mapping rule that does not translate the location information of the data sets. Column 415 corresponds to a second mapping rule that translates the location information of the data sets in the x-direction by a predetermined amount, e.g., 0.5 degrees. Column 420 corresponds to a third mapping rule that translates the location information of the data sets in the y-direction by a predetermined amount, e.g., 0.5 degrees. Column 425 corresponds to a fourth mapping rule that translates the location information of the data sets in both the x-direction and the y-direction by a predetermined amount, e.g., 0.5 degrees. The first row of table 400, row 430, describes the direction and amount of translation for each of the four mapping rules. The other rows in table 400 define the location information of the first and second data sets as affected by possible translations of different mapping rules. Table 400 is described in more detail with respect to FIGS. 5A, 5C, 5E, and 5G.

Figure 4B:
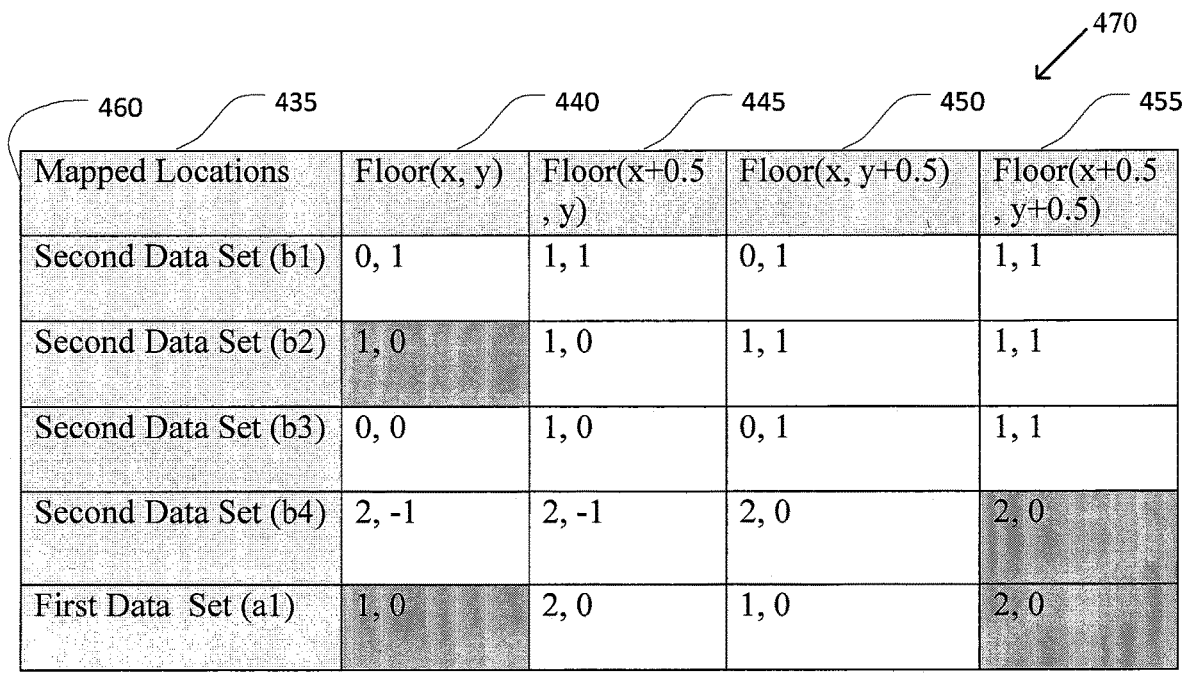
FIG. 4B is an exemplary table of mapped data sets, according to an embodiment.

FIG. 4B is an exemplary table 470 of mapped data sets according to an embodiment. Table 470 includes a column 435 that describes the row contents of table 470 that includes the quantized physical locations corresponding to the second data sets b1, b2, b3, and b4, as well as the quantized physical location corresponding to the first data sets a. As described above, location quantization module 136 of mapping module 130, depending on the mapping rule, quantizes the location information of the data sets in the location space. As an example, the quantization in table 470 is the floor operation. Table 470 includes four columns 440, 445, 450, and 455 such that each one of the columns corresponds to a different mapping rule and each one of the columns represents the quantized location corresponding to the mapping rule. Column 440 corresponds to the quantized location of the first mapping rule that does not translate the location information of the data sets. Column 445 corresponds to the quantized location of the second mapping rule that translates the location information of the data sets in the x-direction by a predetermined amount, e.g., 0.5 degrees. Column 450 corresponds to the quantized location of the third mapping rule that translates the location information of the data sets in the y-direction by a predetermined amount, e.g., 0.5 degrees. Column 455 corresponds to the quantized location of the fourth mapping rule that translates the location information of the data sets in both the x-direction and the y-direction by a predetermined amount, e.g., 0.5 degrees. The first row of table 470, row 460, describes the direction and amount of translation for each of the four mapping rules as well as a type of the quantization operation. The other rows in table 470 show the quantized location information of one data set as affected by possible translations of different mapping rules followed by quantization. Table 470 is described in more detail with respect to FIGS. 5B, 5D, 5F, and 5H.

In some embodiments, the location information of the data sets are normalized in a predetermined scheme and the location bins are defined in a predetermined arrangement such that quantization of the location information of the data sets maps the data sets to the nodes of the location bins. In some examples, the nodes of the location bins are distributed such that they coincide at values that may have one-to-one correspondence to integer values such that the nodes may be located at integer values.

In some examples as shown in table 470 of FIG. 4B, the translated and quantized first data set may become equal to one or more translated and quantized second data sets such that the translated and quantized first data set and one or more translated and quantized second data sets may coincide at a same node of a location bin. As shown in table 470, the second data set b2 and the first data set a1 may coincide at node (1,0) and also the second data set b4 and the first data set a1 may coincide at node (2,0). In some examples, the physical distance between the first data set a1 and the second data sets b2 and b4 are determined as describe above with respect to determination module 160 and the second data set having the least distance with the first data set may be found as the target second data set.

FIGS. 5A-5H show maps 500, 510, 520, 530, 540, 550, 560, and 570 of exemplary data sets mapped to location bins according to an embodiment. FIGS. 5A-5H may correspond to the two by three bin section 360 of FIG. 3 having a highlighted background. In each figure, the line 504 shows the mesh structure consistent with mesh 320 of FIG. 3 that defines the location bins. In some embodiments, the location space is a two-dimensional space defined by x-direction 516 consistent with the x-direction 316 of FIG. 3 and y-direction 518 consistent with the y-direction 318 of FIG. 3, and the location bins have a same first size 524 in x-direction 516 and a same second size 522 in y-direction 518. In some examples as shown in FIGS. 5A-5H, the location information and the location space is normalized such that the nodes of the location bins coincide with integer numbers. FIGS. 5A, 5C, 5E, and 5G show the first and second data sets that correspond, respectively, to the first, second, third, and fourth mapping rules after performing the possible location translation by the location translation module 134 of mapping module 130. The FIGS. 5B, 5D, 5F, and 5H show the first and second data sets that correspond, respectively, to the first, second, third, and fourth mapping rules after performing the quantization by the location quantization module 136 of mapping module 130.

In some examples, FIGS. 5A, 5C, 5E, and 5G are consistent with the respective columns 410, 415, 420, and 425 of table 400, and FIGS. 5B, 5D, 5F, and 5H are consistent with the respective columns 440, 445, 450, and 455 of table 470. FIGS. 5A, 5C, 5E, and 5G show the second data sets 502 and the first data set 506. FIGS. 5B, 5D, 5F, and 5H also show the node 512 having one second data set, node 526 having the first data set, node 514 having two second data sets, node 528 having three second data sets, and target node 532 having the first data set coinciding with the second data set. Therefore, the two target nodes 532 are consistent with the corresponding node (1,0) and (2,0) in FIG. 4B. In some examples, the physical distance between the first data set and the second data set at the two target nodes 532 are determined as described above with respect to determination module 160 and the second data set having the least distance with the first data set may be found as the target second data set.

Figure 6A:
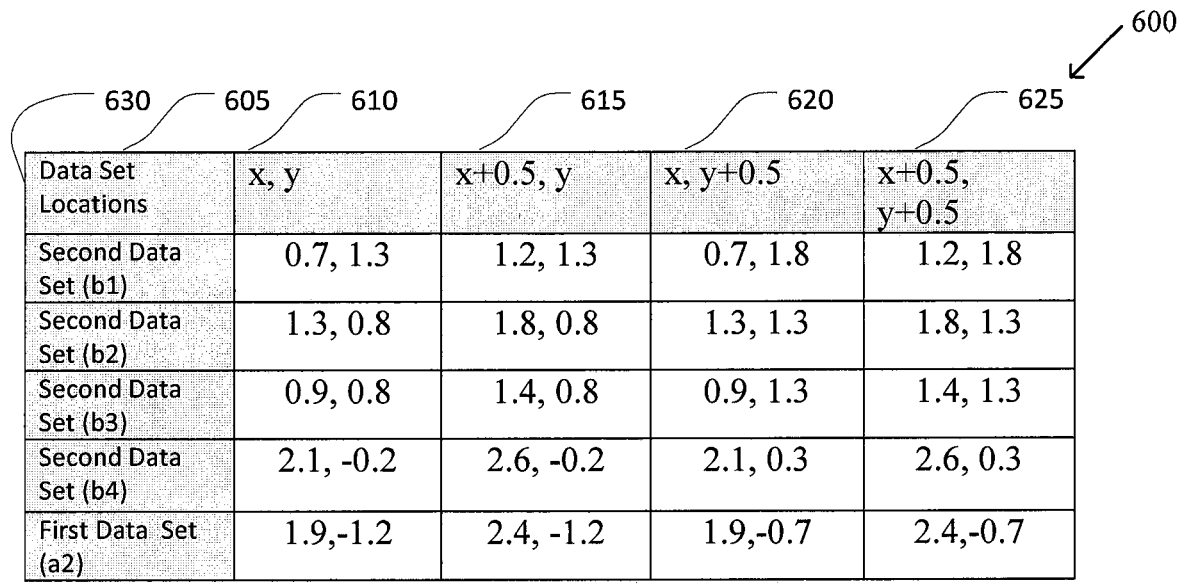
FIG. 6A is an exemplary table of data sets, according to an embodiment.

FIG. 6A is an exemplary table 600 of data sets according to an embodiment. Table 600 includes a column 605 that describes the row contents in table 600 as the physical locations corresponding to the second data sets b1, b2, b3, and b4, as well as the physical location corresponding to a first data set a2. As described above, location translation module 134 of mapping module 130, depending on the mapping rule, translates the location information of the data sets in the location space. Table 600 includes four columns 610, 615, 620, and 625 such that each one of the columns corresponds to a different mapping rule and each one of the columns represents the translation direction and amount of the corresponding mapping rule. Column 610 corresponds to a first mapping rule that does not translate the location information of the data sets. Column 615 corresponds to a second mapping rule that translates the location information of the data sets in the x-direction by a predetermined amount, e.g., 0.5 degrees. Column 620 corresponds to a third mapping rule that translates the location information of the data sets in the y-direction by a predetermined amount, e.g., 0.5 degrees. Column 625 corresponds to a fourth mapping rule that translates the location information of the data sets in both the x-direction and the y-direction by a predetermined amount, e.g., 0.5 degrees. The first row of table 600, row 630, describes the direction and amount of translation for each of the four mapping rules. The other rows in table 600 define the location information of the first and second data sets as affected by possible translations of different mapping rules. Table 600 is consistent with table 400 of FIG.

4A such that the second data sets in the two tables are the same, with the exception that the first data sets in the two tables are not the same.

Figure 6B:
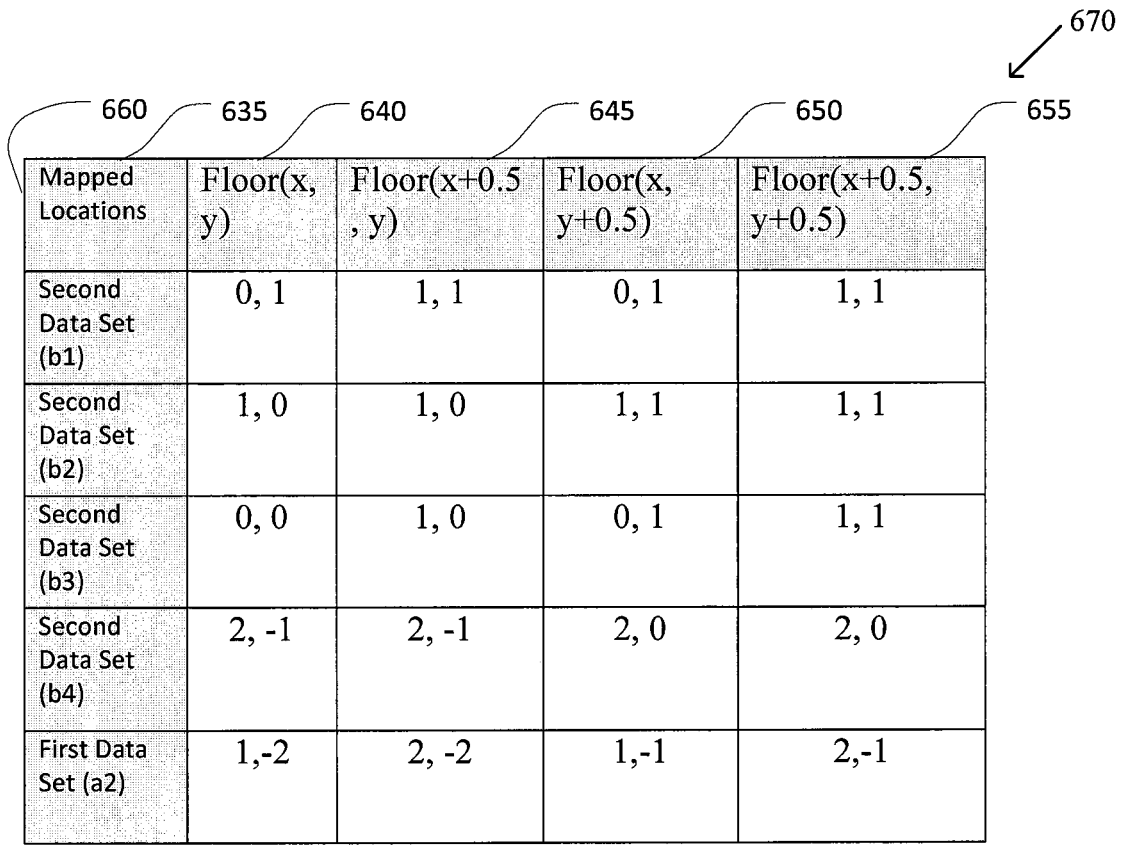
FIG. 6B is an exemplary table of mapped data sets, according to an embodiment.

FIG. 6B is an exemplary table 670 of mapped data sets according to an embodiment. Table 670 includes column 635 that describes the row contents of table 670 as the quantized physical locations corresponding to the second data sets b1, b2, b3, and b4, as well as the quantized physical location corresponding to the first data set a2. As described above, location quantization module 136 of mapping module 130, depending on the mapping rule, quantizes the location information of the data sets in the location space. As an example, the quantization in table 670 is the floor operation. Table 670 includes four columns 640, 645, 650, and 655 such that each one of the columns corresponds to a different mapping rule and each one of the columns represents the quantized location corresponding to the mapping rule. Column 640 corresponds to the quantized location of the first mapping rule that does not translate the location information of the data sets. Column 645 corresponds to the quantized location of the second mapping rule that translates the location information of the data sets in the x-direction by a predetermined amount, e.g., 0.5 degrees. Column 650 corresponds to the quantized location of the third mapping rule that translates the location information of the data sets in the y-direction by a predetermined amount, e.g., 0.5 degrees. Column 655 corresponds to the quantized location of the fourth mapping rule that translates the location information of the data sets in both the x-direction and the y-direction by a predetermined amount, e.g., 0.5 degrees. The first row of table 670, row 660, describes the direction and amount of translation for each of the four mapping rules as well as a type of the quantization operation. The other rows in table 670 show the quantized location information of one data set as affected by possible translations of different mapping rules followed by quantization. Table 670 is consistent with table 470 of FIG. 4B such that the second data sets in the two table are the same, with the exception that the first data sets in the two table are not the same.

In some examples as shown in table 670 of FIG. 6, the translated and quantized first data set may not equal to one of the translated and quantized second data sets, the translated and quantized first data set may not coincide with one of the translated and quantized second data sets at a node of a location bin, and/or no target node may be found. For example, no location bin may be found that, after the translation and quantization the first data set a2 and one of the second data sets b1, b2, b3, or b4, coincides in that location bin, no target second data set may be found, and/or no least distance between the first data set a2 and the plurality of second data sets may be found.

As described above, when zero target node module 150 determines that no target node is found, the bin size updating module 180 may adjust, e.g., increase, the location bin size of the segmentation module 120. In some examples the location bin size may be doubled. In some examples, the nodes may be kept the same even after changing the bin size and thus instead of increasing the bin size, the location information of the data sets are proportionally reduced. For examples, instead of doubling the bin size, the location information of the data sets are divided in half as shown in the tables of FIGS. 7A and 7B.

Figure 7A:
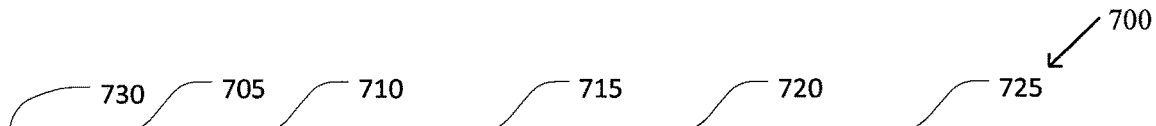
FIG. 7A is an exemplary table of data sets, according to an embodiment.

FIG. 7A is an exemplary table 700 of data sets according to an embodiment. Table 700 includes column 705 that describes the row contents in table 700 as the physical locations corresponding to the second data sets b1, b2, b3, and b4, as well as the physical location corresponding to a first data set a2. As described above, location translation module 134 of mapping module 130, depending on the mapping rule, translates the location information of the data sets in the location space. However, before performing any operation, the location information of the data sets are divided in half without modifying the location bins, which has the effect of doubling the location bin size and at the same time keeping the nodes of the location bins at the same integer numbers. Table 700 includes four columns 710, 715, 720, and 725 such that each one of the columns corresponds to a different mapping rule and each one of the columns represents the translation direction and amount of the corresponding mapping rule. Column 710 corresponds to a first mapping rule that does not translate the location information of the data sets. Column 715 corresponds to a second mapping rule that translates the location information of the data sets in the x-direction by a predetermined amount, e.g., 0.5 degrees. Column 720 corresponds to a third mapping rule that translates the location information of the data sets in the y-direction by a predetermined amount, e.g., 0.5 degrees. Column 725 corresponds to a fourth mapping rule that translates the location information of the data sets in both the x-direction and the y-direction by a predetermined amount, e.g., 0.5 degrees. In some examples, although the modified location information is translated, however, the translation amount does not change. The first row of table 700, row 730, describes the direction and amount of translation for each of the four mapping rules. The other rows in table 700 define the modified location information of the first and second data sets as affected by possible translations of different mapping rules. Table 700 is consistent with table 600 of FIG. 6A, with the exception that the location information is divided in half.

Figure 7B:
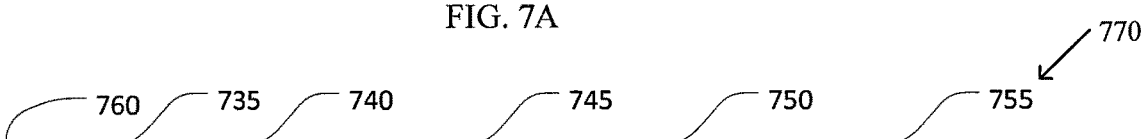
FIG. 7B is an exemplary table of mapped data sets, according to an embodiment.

FIG. 7B is an exemplary table 770 of mapped data sets according to an embodiment. Table 770 includes column 735 that describes the row contents of table 770 as the quantized physical locations, divided by half, corresponding to the second data sets b1, b2, b3, and b4, as well as the quantized physical location, divided in half, corresponding to the first data set a2. As described above, location quantization module 136 of mapping module 130, depending on the mapping rule, quantizes the location information of the data sets in the location space. As an example, the quantization in table 770 is the floor operation. Table 770 includes four columns 740, 745, 750, and 755 such that each one of the columns corresponds to a different mapping rule and each one of the columns represents the quantized location corresponding to the mapping rule. Column 740 corresponds to the quantized location of the first mapping rule that does not translate the location information of the data sets. Column 745 corresponds to the quantized location of the second mapping rule that translates the location information of the data sets in the x-direction by a predetermined amount, e.g., 0.5 degrees. Column 750 corresponds to the quantized location of the third mapping rule that translates the location information of the data sets in the y-direction by a predetermined amount, e.g., 0.5 degrees. Column 755 corresponds to the quantized location of the fourth mapping rule that translates the location information of the data sets in both the x-direction and the y-direction by a predetermined amount, e.g., 0.5 degrees. The first row of table 770, row 760, describes the direction and amount of translation for each of the four mapping rules as well as a type of the quantization operation. The other rows in table 770 show the quantized location information of one data set, divided by two, affected by a possible translations of different mapping rules, and followed by quantization. Table 770 is consistent with table 670 of FIG. 6B, with the exception that the location information is divided in half.

In some examples as shown in table 770 of FIG. 7B, the divided, translated, and quantized first data set may become equal to one or more divided, translated, and quantized second data sets such that the divided, translated, and quantized first data set and one or more divided, translated, and quantized second data sets may coincide at a same or target node of a location bin. As shown in table 770, the second data set b4 and the first data set a2 may coincide at target node (1, −1). In some examples, when there is one target node, the physical distance between the first data set a2 and the second data sets b4 is determined as described above with respect to determination module 160 as the least distance of the plurality of second data sets with the first data set.

Figure 8:
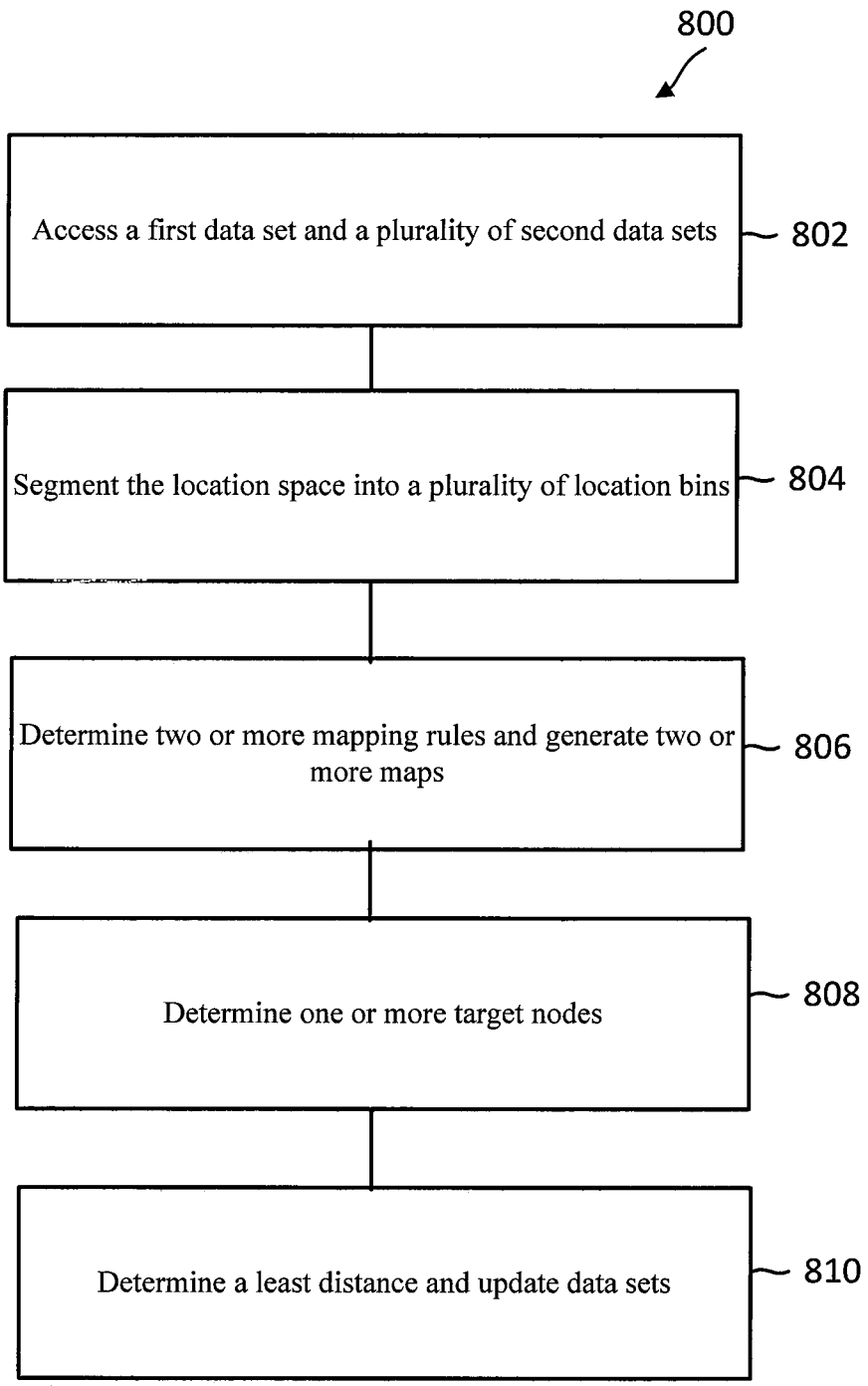
FIG. 8 illustrates an exemplary method, according to an embodiment.

FIG. 8 illustrates an exemplary method 800 according to an embodiment. Method 800 can be used for performing proximity determination of a first data set to a plurality of second data sets. Notably, one or more steps of the method 800 described herein may be omitted, performed in a different sequence, and/or combined with other methods for various types of applications contemplated herein. The method 800 can be performed by the system 100 or 200 shown in FIGS. 1 and 2.

One or more of the processes 802-810 of method 800 may be implemented, at least in part, in the form of executable code stored on non-transient, tangible, machine readable media that when run by one or more processors (e.g., the processor 202 in system 200) may cause the one or more processors to perform one or more of the processes 802-810. In some embodiments, method 800 may be performed by one or more modules, such as modules 210, 220, 230, 240, 250, 260, 270, and 280 of FIG. 2.

As shown in FIG. 8, at step 802, the method 800 may include accessing a first data set and accessing a plurality of second data sets. For example, referring back to FIG. 1A, data access module 110 of system 100 may access databases 105 and 115 and may retrieve a first data set 112 from database 105 and a plurality of second data sets 114 from database 115. In some examples, the data sets 112 and 114 include location information corresponding to a physical location corresponding to the data set, for example, physical locations that the data sets are generated and/or last updated. After retrieving the data sets 112 and 114, the data access module 110 may determine the location information of the data sets 112 and 114.

At step 804, the method 800 may include segmenting the location space into a plurality of location bins. For example, referring back to FIG. 1A and FIG. 1B, segmentation module 120 of system 100 may determine, e.g., define a location space consistent with the location space 310 of FIG. 3 and may segment the location space into a plurality of location bins consistent with the location bins 330 of FIG. 3. In some embodiments, the segmentation module 120, e.g., the location bin determination module of the segmentation module 120, may receive the location bin size, including x-direction and y-direction sizes 322 and 324, from the bin size updating module 180 and may segment the location space 310 based on the location bin sizes. Alternative the segmentation module 120 retrieve the location bin size from a memory, e.g., memory 204 of FIG. 2. In some embodiments, the location space may be defined as the space where the data sets 112 and 114, based on the location information, are included in that space.

At step 806, the method 800 may include determining two or more mapping rules and generating two or more maps.

For example, referring back to FIG. 1A and FIG. 1C, mapping module 130 of system 100 may use the two or more mapping rules to map the data sets 112 and 114 into the nodes of the location bins and generate two or more maps. The mapping module 130 may receive the data sets 112 and 114, the location space 310, and the plurality of location bins 330, and select two or more mapping rules. In some examples, a mapping rule may include translating, e.g., moving the location information of the data sets 112 and 114 as well as quantizing the location information of the data sets 112 and 114 after the translation.

In some examples, the two or more mapping rules may be selected, e.g., retrieved from memory 204, and the mapping module 130 may use the mapping rules to map the data sets 112 and 114 to the location bins. In some embodiments, the location quantization module 136 of the mapping module 130 maps the data sets 112 and 114 into the nodes of the location bins that are consistent with the nodes 340 of FIG. 3. The two or more maps are consistent with the maps 510, 530, 550, and 570 of FIGS. 5B, 5D, 5F, and 5H.

At step 808, the method 800 may include determining one or more target nodes. For example, referring back to FIG. 1A, examination module 140 of system 100 may receive the two or more generated maps from the mapping module 130 and may examine the two or more maps to generate one or more target nodes in the two or more maps. In some examples, a target node in a generated map is a node of a location bin where a first data set 112 and at least one second data set 114 coincide. As an example, nodes 532 of FIG. 5B and FIG. 5H are target nodes.

At step 810, the method 800 may include determining a least distance and updating the data sets. For example, referring back to FIG. 1A and FIG. 1D, determination module 160 of system 100 may receive one or more target nodes and may determine one or more target distances at each one of the target nodes between the first data set 112 and one or more second data sets at the same target node. Although at a target node, a first data set 112 and at least a second data set 114 my coincide, the coincidence is achieved by quantization, and the physical distance between the first data set 112 and the second data set 114 at the same target node may not be zero. The target distances are the physical distances between a first data set 112 and a second data set 114 coinciding at the same target node. The distance determination module 164 of the determination module 160 may determine a minimum of the one or more target distances as the least distance between the first data set 112 and the plurality of second data sets 114. The second data set 114 having the least distance with the first data set 112 is a target second data set. Further, the first data set is validated based on the target second data set as described above, and if validation is successful, the first data set is incorporated into the plurality of second data sets. In some examples, the first data set is in first database, e.g., database 105 of FIG. 1A, and the plurality of second data sets are in a second database, e.g., database 115 of FIG. 1A, and after validation, the first data set may be removed from the first database and may be merged into the second database. If validation is not successful, the first data set may be marked as a fraudulent data set in the first database.

In some examples, the additional information of the first data set and the second data sets include an Internet Protocol (IP) address. In some examples, a fraudulent IP address of the first data set may be detected based on a comparison of the IP address of the first data set with the IP address of the target second data set.

Thus, using embodiments described herein, computer processing power and/or time may be reduced.

The present disclosure, the accompanying figures, and the claims are not intended to limit the present disclosure to the example embodiments disclosed. As such, it is contemplated that various alternate embodiments and/or modifications to the embodiment disclosed, whether explicitly described or implied herein, are possible in light of the disclosure and/or the figures. Having thus described embodiments of the present disclosure, persons of ordinary skill in the art will recognize that changes may be made to the embodiments disclosed without departing from the scope of the present disclosure.

The invention claimed is:

1. A method comprising:
receiving, by one or more hardware processors, a first data set corresponding to a transaction request, wherein the first data set comprises first location information corresponding to a first location in a location space;
accessing, by the one or more hardware processors, a plurality of second data sets corresponding to a plurality of transactions, wherein each one of the plurality of second data sets comprises second location information corresponding to a corresponding second location in the location space;
segmenting, by the one or more hardware processors, the location space into a plurality of location bins based at least on a location bin size of the first data set;
determining, by the one or more hardware processors, one or more nodes for the plurality of location bins, wherein each node of the one or more nodes is associated with at least a corresponding one of the plurality of location bins;
mapping, by the one or more hardware processors, the first data set to a first node from the one or more nodes using a mapping rule;
mapping, by the one or more hardware processors, each one of the plurality of second data sets to at least one of the one or more nodes using the mapping rule;
determining, by the one or more hardware processors, that the first node to which the first data set is mapped is not associated with any second data set in the plurality of second data sets;
in response to determining that the first node to which the first data set is mapped is not associated with any second data set in the plurality of second data sets, iteratively increasing, by the one or more hardware processors, the location bin size and remapping the first data set and the plurality of second data sets to different nodes until both of the first data set and at least one of the plurality of second data sets are mapped to a particular node using the mapping rule;
determining, by the one or more hardware processors, that both the first data set and the at least one of the plurality of second data sets are mapped to the particular node from the one or more nodes;
determining, by the one or more hardware processors, whether the first data set is validated based on non-location information associated with a fraudulent transaction, but not included in, the at least one of the plurality of second data sets;
determining, by the one or more hardware processors, that the first data set is associated with the fraudulent transaction in response to determining that the first data set is not validated based on the non-location information; and
denying the transaction request based on the determining that the first data set is associated with the fraudulent transaction.

2. The method of claim 1, further comprising determining the location bin size prior to the segmenting.

3. The method of claim 1, further comprising retrieving first non-location information associated with the first data set, wherein the non-location information associated with the at least one of the plurality of second data sets is second non-location information, and wherein the determining whether the first data set is validated comprises comparing the first non-location information against the second non-location information.

4. The method of claim 3, wherein the first non-location information comprises a first Internet Protocol (IP) address, wherein the second non-location information comprises a second IP address, and wherein the method further comprises detecting a fraudulent IP address of the first data set based on a comparison between the first IP address and the second IP address.

5. The method of claim 1, further comprising:
quantizing the second location information of the plurality of second data sets; and
quantizing the first location information of the first data set.

6. The method of claim 5, further comprising:
translating the first location information of the first data set in a predetermined direction by a predetermined amount prior to the quantizing; and
translating the second location information of the plurality of second data sets in the predetermined direction by the predetermined amount prior to the quantizing.

7. The method of claim 5, wherein the quantizing the first location information comprises performing one of a floor operation, a ceiling operation, or a rounding operation on the first location information.

8. A system comprising:
a non-transitory memory; and
one or more hardware processors coupled to the non-transitory memory and configured to read instructions from the non-transitory memory to cause the system to perform operations comprising:
receiving a first data set corresponding to a transaction request, wherein the first data set comprises first location information corresponding to a first location within a location space;
accessing a plurality of second data sets corresponding to a plurality of transactions, wherein each one of the second data sets comprises second location information corresponding to a corresponding second location within the location space;
segmenting the location space into a plurality of location bins comprising a plurality of nodes based at least on a location bin size, wherein each one of the plurality of location bins comprises one or more nodes from the plurality of nodes;
mapping the first data set to a first node from the plurality of nodes using a mapping rule;
mapping each one of the plurality of second data sets to at least one of the plurality of nodes using the mapping rule;
determining that none of the second data sets is mapped to the first node to which the first data set is mapped based on the mapping rule;
in response to the determining that none of the second data sets is mapped to the first node to which the first data set is mapped, iteratively increasing the location bin size and remapping the first data set and the plurality of second data sets to different nodes using the mapping rule;

determining that both the first data set and the at least one of the plurality of second data sets are mapped to a particular node of the one or more nodes;

determining whether to validate the first data set based at least in part on non-location information associated with a fraudulent transaction, but not included in, the at least one of the plurality of second data sets; and processing the transaction request based on the determining whether the first data set is validated.

9. The system of claim 8, wherein the operations further comprise retrieving first non-location information associated with the first data set, wherein the non-location information associated with the at least one of the plurality of second data sets is second non-location information, and wherein the validating the first data set comprises comparing the first non-location information against the second non-location information.

10. The system of claim 9, wherein the first non-location information comprises a first Internet Protocol (IP) address, wherein the second non-location information comprises a second IP address, and wherein the operations further comprise detecting a fraudulent IP address of the first data set based on a comparison between the first IP address and the second IP address.

11. The system of claim 8, wherein the operations further comprise in response to validating the first data set, merging the first data set into the plurality of second data sets.

12. The system of claim 8, wherein the operations further comprise segmenting the location space based on the increased location bin size.

13. The system of claim 8, wherein a first location bin in the plurality of location bins comprises two or more nodes, and wherein at least one of the two or more nodes is shared with a second location bin adjacent to the first location bin.

14. The system of claim 8, wherein the operations further comprise determining that the first location of the first data set is closest to a particular second location of the at least one of the plurality of second data sets based on the first data set and the at least one of the plurality of second data sets being mapped to the particular node.

15. The system of claim 8, wherein the operations further comprise:

quantizing the second location information of the plurality of second data sets; and quantizing the first location information of the first data set, wherein the quantizing the first location information comprises performing one of a floor operation, a ceiling operation, or a rounding operation on the first location information.

16. A non-transitory machine-readable medium having stored thereon machine-readable instructions executable to cause a machine to perform operations comprising:

accessing a first data set corresponding to a transaction request, wherein the first data set comprises first location information corresponding to a first geographical location;

accessing a plurality of second data sets corresponding to a plurality of transactions, wherein each one of the plurality of second data sets comprises second location information corresponding to a corresponding second geographical location;

determining a geographical area that encompasses the first geographical location and the second geographical location;

segmenting the geographical area into a plurality of location bins comprising a plurality nodes based at least on a location bin size, wherein each one of the plurality of location bins comprises one or more nodes from the plurality of nodes;

mapping the first data set to a first node from the plurality of nodes;

mapping each second data set of the plurality of second data sets to at least one node from the plurality of nodes;

determining that none of the plurality of second data sets is mapped to the first node, to which the first data set is mapped;

in response to determining that none of the plurality of second data sets is mapped to the first node, iteratively increasing the location bin size and remapping the first data set and the plurality of second data sets to different nodes until both of the first data set and at least one of the plurality of second data sets are mapped to a particular node;

determining a physical distance between the first geographical location and a particular second geographical location corresponding to the at least one of the second data sets;

determining whether the first data set is associated with a fraudulent transaction based at least in part on the physical distance; and processing the transaction request based on the determining whether the first data set is associated with the fraudulent transaction.

17. The non-transitory machine-readable medium of claim 16, wherein a first location bin in the plurality of location bins comprises a node shared with a second location bin that is adjacent to the first location bin.

18. The non-transitory machine-readable medium of claim 16, wherein each of the first geographical location and the particular second geographical location comprises a longitude and a latitude.

19. The non-transitory machine-readable medium of claim 16, wherein the geographical area is one of a district in a city, one or more cities, one or more states in a country, one or more countries, one or more continents, or an entire globe.

20. The non-transitory machine-readable medium of claim 16, wherein the operations further comprise determining the location bin size prior to the segmenting.

* * * * *